April 10, 1951 F. RASTLER 2,548,174
SINGLE ACTION FISHING REEL HAVING A COMBINED
FRICTION DRAG AND BRAKE
Filed April 12, 1948 2 Sheets-Sheet 1
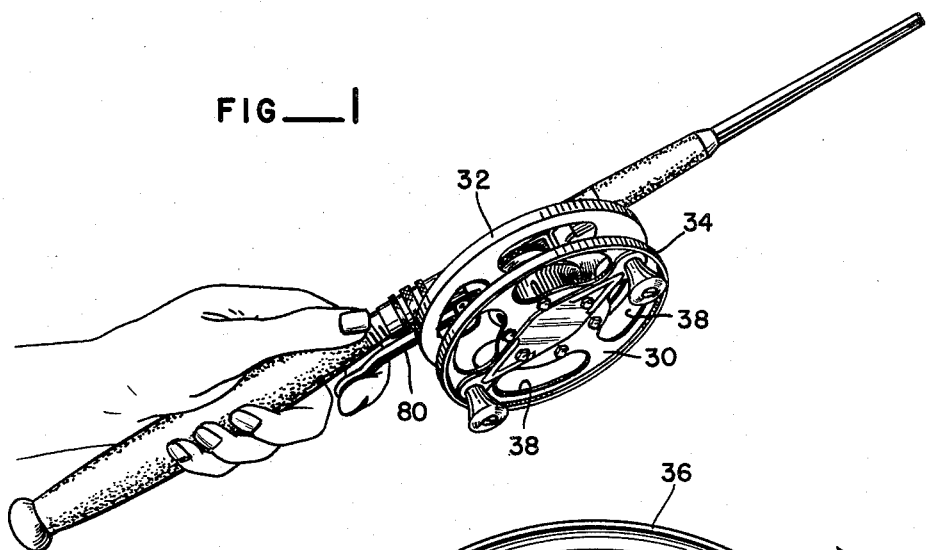
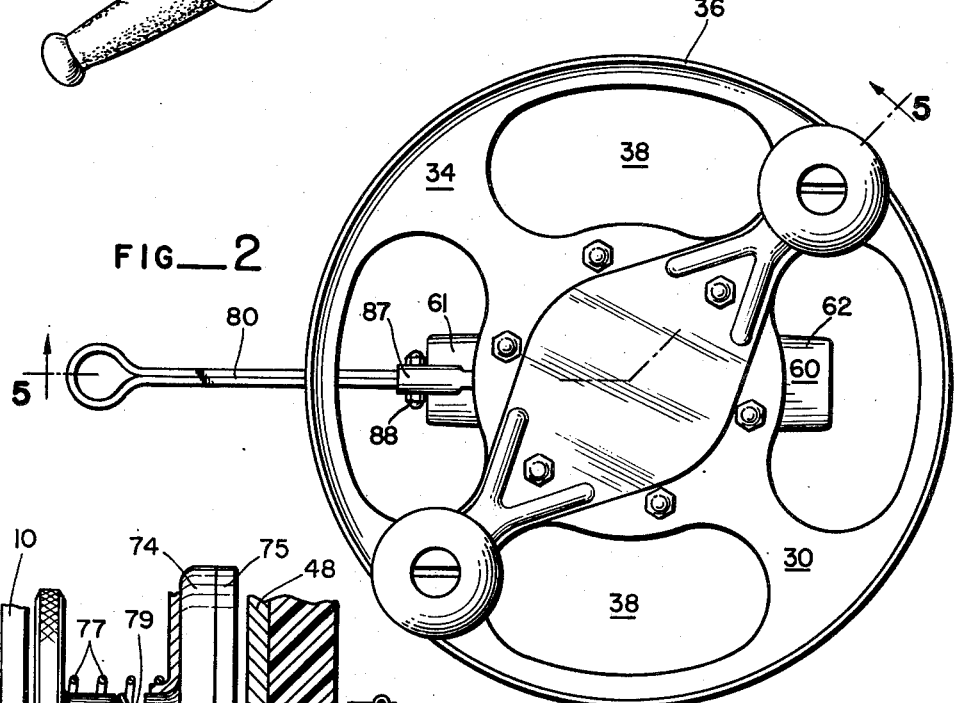
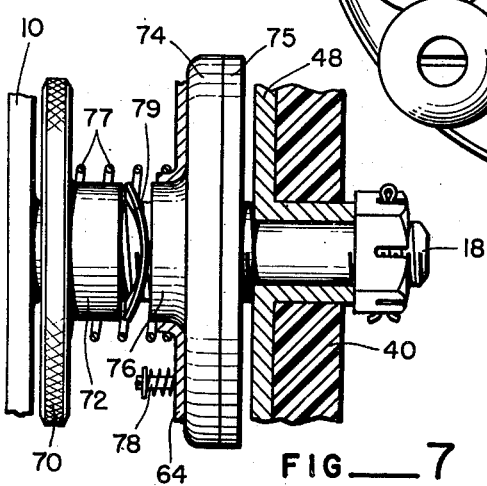
FRANK RASTLER Inventor
By Smith & Tuck
Attorneys

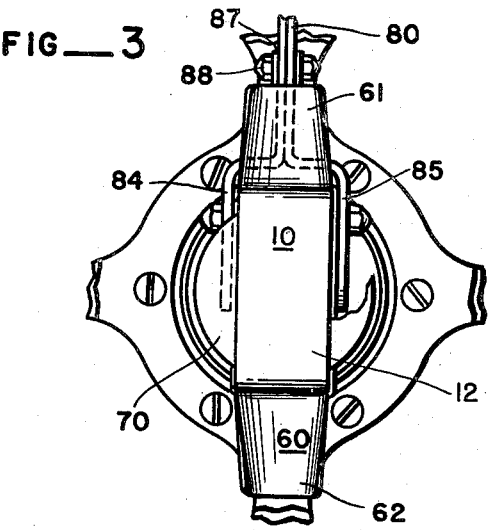
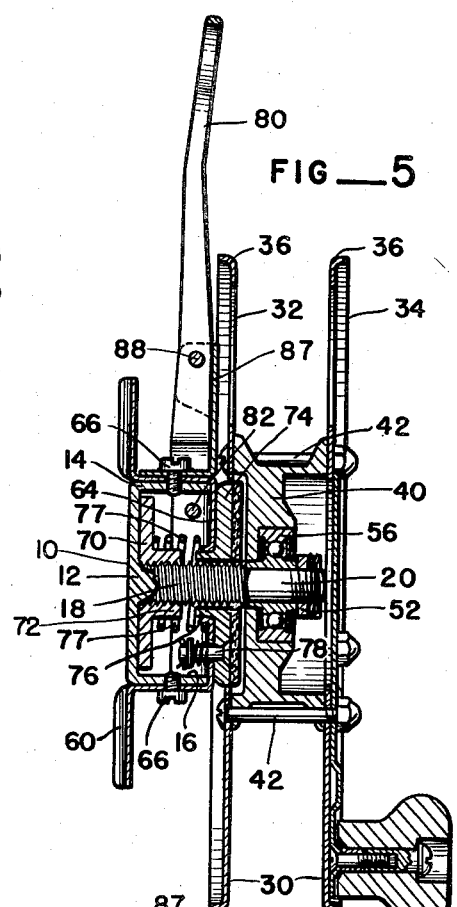
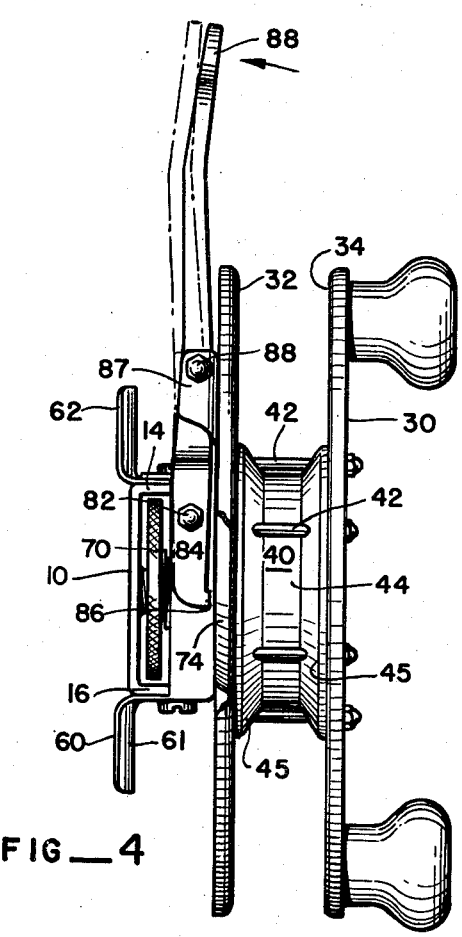
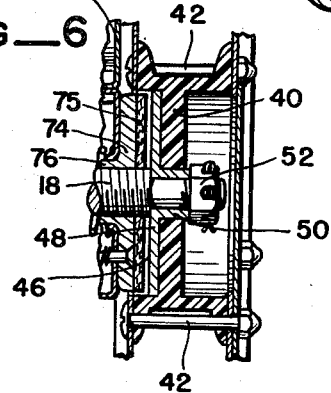

Patented Apr. 10, 1951

2,548,174

UNITED STATES PATENT OFFICE 2,548,174

SINGLE ACTION FISHING REEL HAVING A COMBINED FRICTION DRAG AND BRAKE

Frank Rastler, Renton, Wash.

Application April 12, 1948, Serial No. 20,415

3 Claims. (Cl. 242—84.5)

My present invention relates to the general art of sport fishing reels and more particularly to a single action fishing reel having a combined friction drag and brake.

Fishing reels are normally adapted for the type of fishing in which they are to be used, and in the various categories, reels may be generally classified as precision type reels, which are characterized by niceties of construction which make them readily adaptable for use by experts who desire to get the utmost aid from their reels. These, however, are normally characterized by excessive manufacturing costs. On the other hand, reels may be termed commercial reels which may be had on the open market at prices ranging from ten-cent-store types to those costing a few dollars. These reels, while serving their purpose, do not admit of accurate and delicate adjustments, and are usually the reels employed by beginners in the fishing field or by those who fish so seldom that they do not care to make a substantial investment. This general price classification applies particularly to single action reels, where we have many that are substantially custom built and which are delightful to use and, on the other hand, the single action reel with its absence of gearing can be built where desired for a minimum cost.

It is the principal object of my present invention, therefore, to provide a single action reel which can be fabricated from stampings, and which will have a brake arrangement so constructed that it serves as an adjustable pressure type of drag, and when it is desired, a second operating means can convert this unit into an effective brake. The construction I have employed permits me to produce a fishing reel that gives the nicety of control experienced in high priced custom reels, while at the same time enjoying the benefits of its unusual construction to keep it well within the moderate prices, and thus make my reel available to a greater number of fishermen.

A further object of my invention is to provide a reel which is simple in construction which in itself insures long life and permits easy cleaning, oiling, and servicing.

A further object of my invention is to provide a combined brake and drag mechanism, wherein two separate controls are caused to act upon the same friction surface so that the drag can be adjusted to the degree desired, and when occasion arises the brake can then be applied to the same friction surface to obtain any desired degree of braking.

A further object of my invention is to provide a reel spool construction so arranged that, with the substitution of only a bearing and a spool arbor, my reel may be supplied as a sleeve-bushed type or an anti-friction type.

A further object is to provide a simply constructed anti-back lash for use in bait casting.

Further objects, advantages and capabilities will be apparent from the description and disclosures in the drawings or may be comprehended or are inherent in the device.

In the drawings:

Fig. 1 is a perspective view showing one manner of using my fishing reel.

Fig. 2 is a front face view of my reel.

Fig. 3 is a back face view of my reel, with certain parts broken away.

Fig. 4 is a side elevational view of my reel.

Fig. 5 is a view taken in the same sense as Fig. 4, but shown in cross-section as though sectioned along a vertical plane passing through the center of Fig. 4; such a broken section is indicated by line 5—5 of Fig. 2.

Fig. 6 is a vertical sectional view, in fragmentary form, taken in the same sense as the section of Fig. 5, but showing an alternate construction for my spool arbor which employs a sleeve bearing instead of the anti-friction bearing.

Fig. 7 is a fragmentary view, partly in section, and on an enlarged scale, showing a secondary brake arrangement.

Referring to the drawings throughout which like reference characters indicate like parts, my reel consists essentially of a frame-work upon which is revolvably positioned the line holding spool. A drag and brake mechanism which controls the rotation of the spool with respect to the frame, completes the reel. Frame 10 is formed with a plate portion 12 and inturned ends as 14 and 16. Centrally disposed on plate 10 is the pressure screw 18, which ends in a reduced diameter end portion 20 which forms the seat or journal for spool 30.

The spool of my reel consists of similar side plates 32 and 34. These I prefer to form of sheet stock of light gauge and to give the same additional strength by means of rims rolled out of the stock as at 36 and also, in the interest of reducing the weight of the revolving mass, to cut out the metal of the side plates, as is probably best illustrated in Fig. 2, where I have provided a plurality of openings 38 which while serving to lighten the side plates, provide excellent means for ventilating the line which is normally contained between the side plates and upon arbor 40.

Side plates 32 and 34 are held in spaced parallel relationship by arbor 40, which is centrally disposed and is pierced by a plurality of tie bolts 42, which pass through the two side plates and the arbor so as to bind them together in one unit. I have found it desirable to have tie bolts 42 spaced away slightly from the inner surface 44 of arbor 40, and to provide the flaring side portions 45. This provides a convenient construction and aids in drying the inner turns of the fishing line.

Arbor 40 may be formed as shown in either Fig. 5 or 6. Fig. 5 is preferred for the higher priced reel and Fig. 6 when minimum expense is desired. In each case, however, the outer surface of the arbor is identical, as is also the recessed friction surface 46. In Fig. 6 I have shown a still further variation of construction in, that the spool is shown to be of non-metallic material, thus I might employ plastic or wood or any other suitable material. When non-metallic materials are used I have found it desirable to use a friction surface plate 48, which lies upon, and is normally fixedly secured to what would otherwise be the friction surface 46. When this plate is employed, it is necessary to recess the same so that its outer or left hand surface as viewed in Fig. 6 is on the same plane as friction surface 46 of Fig. 5. Axially disposed with reference to plate 48, is the sleeve bearing 50. This sleeve revolves upon the reduced end portion 20 of pressure screw 18 and its extreme end forms a bearing surface for nut 52, and thus the spool assembly 30 is held to the frame 10.

In the precision form shown in Fig. 5, I employ normally a light weight metal arbor 40, which is machined at its center to accept an anti-friction bearing 56. Bearing 56 in turn, is mounted upon the reduced end portion 20 of screw 18 and is held in position thereon, preferably by a castellated nut 52, employing a pin or cotter to secure it in place.

My reel is provided with the pole clip 60 having the two customary reel seat engaging ends 61 and 62. The metal connecting ends 61 and 62 is bent inwardly and then again back to the parallel relationship with respect to ends 61 and 62, so as to form the inner positioning plate 64. The clip is generally held in position with respect to frame 10 by the screws 66, as is best illustrated in Fig. 5.

Disposed upon pressure screw 18 is a pressure adjusting disc 70. This disc has a sleeve-like hub 72, which is threaded to engage the threads of pressure screw 18. The outer edge of the periphery of the pressure adjusting disc 70 is narrow so that it may be most easily turned by the fingers. This is possible by virtue of the fact that plate 12, as will be observed in Fig. 3, is a relatively narrow strap and a good portion of the periphery of disc 70 extends outwardly on each side of this plate so as to make it easy to engage it as with the thumb and forefinger.

Also disposed upon pressure screw 18, is a pressure plate 74. In this instance, however, the pressure plate, while having a sleeve-like hub 76, has a bore therethrough of such a size that it will slidably engage the points of the thread on screw 18 and thereby be guided, slidably thereon.

Secured to pressure plate 74 is the friction disc 75. This disc may be of any suitable material which will co-act with the friction surface of arbor 40, so as to provide the degree of friction desired and which will not score under use.

Disposed between the pressure adjusting disc 70, and the pressure plate 74, is a compression spring or positioning spring 77. This pressure spring makes it possible, through the adjustment of disc 70 upon screw 18, to provide a friction drag that will hold disc 70 in its adjusted position.

In Fig. 7 I provide, an arrangement especially adapted to bait or plug casting, it consisting of interposing a resilient or a spring washer 79 upon screw 18 and between the ends of hubs 72 and 76; and because of the nicety of adjustment that can be achieved by turning disc 70, it provides a very effective means for preventing the spool assembly from overrunning a cast and thus it effectively prevents back-lashes and the like. I find it preferable to have the outside diameter of hub 72 and spring 79 less than the diameter of hub 76.

It is to be noted that plate 64, which is part of the pole clip 60, forms a retracting limit for pressure plate 74. It also forms a seat for the spring-urged through bolts 78, which at all times tend to retract the pressure plate up against plate 64. The spring urged screws 78 perform a second function, namely, that of preventing rotation between plates 74 and frame 10, due to the drag of spool 30.

In order to provide complete control of the reel I have the brake mechanism, which is under the control of brake lever 80 and can be engaged sufficiently to stop the reel under any fishing conditions. Brake lever 80 is pivoted at 82 on a pivot bolt which passes through the two arms 84 and 85, which are formed as the returned ends of the metal strap making up the brake lever 80, and the side webs of clip 60. At their extreme ends, arms 84 and 85 are provided with the brake lever pressure points 86 on either side of plate 64. These points are adapted to engage pressure plate 74 and to thus urge it into frictional engagement with arbor 40 and consequently provide the braking effort for spool 30.

The proportions illustrated throughout my drawings have been found to be very satisfactory, and it will be thus noted that due to the relatively short length of arms 84 and 85 and the relatively long extent of the brake lever 80 that considerable mechanical advantage is provided. Furthermore, inasmuch as pivot 82 is rigidly connected to frame 10, and pressure screw 18 is also fixedly secured to frame 10, these points which normally would be spread by such effort, are of such generous proportions that there is no springing of the materials and consequently considerable pressure can be exerted to force engagement of the friction surface 46 and the pressure plate 74.

In order that my brake lever 80 will always return to the disengaged position, I provide a retractor spring at 87. This spring, it will be noted in Fig. 5, is secured under the upper screw 66 and then is bent out along the brake lever 80 and is pivotably secured thereto by means of the through bolt 88.

In using my reel, it is provided with the usual pole clip members 61 and 62, which are adapted to engage the customary reel seat on a fishing pole. My reel, admitting as it does of light weight construction, where desired, can thus be readily adapted for bait rods, spinning rods, fly rods, and various forms of casting rods. In Fig. 1, I have shown the form that would normally be used with a bait or casting rod. If the reel is to be used on a fly rod, with the reel seat below the rod handle, it would normally be reversed from its position as shown, with the end of lever 80 pointed toward the tip of the rod.

The fisherman having the reel in place, can then, by means of pressure disc 70, adjust the drag he desires on the reel through the abutting of the ends of hubs 72 and 76. This drag, of necessity, changes in accordance with the type of fishing encountered. It may be but lightly engaged, after the showing of Fig. 7, where spring washer 79 is interposed between hubs 72 and 76, when it is desired to prevent backlashing. In more normal use it would be applied with a little more pressure, just to keep the spool stable and prevent it from unwinding at undesired times. Then too, as in trolling, it may be desired to place considerable tension on the brake, so that it will hold the line against the drag of the lures in fishing, and yet it will be possible for a striking fish to take out line without danger of breaking the same. When the fisherman desires to apply actual braking, he merely presses lever 80 in toward the pole, substantially to the degree shown in Fig. 4 by the dot and dashed lines. He then has, with the mechanism previously described, a very complete control of his spool.

It is believed that it will be clearly apparent from the above description and the disclosure on the drawings that the invention comprehends a novel construction of a single action fishing reel having a combined friction drag and brake.

Having thus described my invention, I claim:

1. A fishing reel of the single action type, consisting of: a frame having a plate portion and inturned ends; a pole clip having seat-engaging ends, a central portion forming an inner plate and portions intermediate said inner plate and said ends disposed parallel to and abutting said inturned ends of said frame; a pressure screw secured to said plate portion and positioned perpendicular thereto, and having a journal formed on the end of said screw; a line-holding reel revolvably mounted on said journal; a pressure plate slidably mounted on said pressure screw and adapted to frictionally engage said reel; an adjusting disc having interior threads adapted to engage the threads of said pressure screw and disposed to adjustably position said pressure plate against said reel; a brake lever pivoted on means fixed with respect to said frame and having pressure points, disposed on each side of said frame and adapted to selectively engage said pressure plate and move it against said reel.

2. A fishing reel of the single action type, consisting of: a frame having a plate portion and inturned ends; a pole clip having seat-engaging ends, a central portion forming an inner plate and portions intermediate said inner plate and said ends disposed parallel to and abutting said inturned ends of said frame; a pressure screw secured normally to said plate portion, and having a journal formed on the end of said screw; a line-holding reel revolvably mounted on said journal; a pressure plate slidably mounted on said pressure screw and adapted to frictionally engage said reel said pressure plate having a hub extending through said inner plate; an adjusting disc having interior threads adapted to engage the threads of said pressure screw and having a hub extending along said screw, and disposed to engage the hub of said pressure plate and adjustably position said pressure plate against said reel; a brake lever pivoted on means fixed with respect to said frame and having pressure points, disposed on each side of said frame and adapted to selectively engage said pressure plate and move it against said reel.

3. A fishing reel of the single action type, consisting of: a frame having a plate portion and inturned ends; a pole clip having seat-engaging ends, a central portion forming an inner plate and portions intermediate said inner plate and said ends disposed parallel to and abutting said inturned ends of said frame; a pressure screw secured normally to said plate portion, and having a journal formed on the end of said screw; a line-holding reel revolvably mounted on said journal; a pressure plate slidably mounted on said pressure screw and adapted to frictionally engage said reel; means adapted to retract and to prevent rotation of said pressure plate; and an adjusting disc having interior threads adapted to engage the threads of said pressure screw and disposed to adjustably position said pressure plate against said reel; means adapted to hold said disc in its adjusted position; a brake lever pivoted on means fixed with respect to said frame and having pressure points, disposed on each side of said frame and adapted to selectively engage said pressure plate and move it against said reel.

FRANK RASTLER.

No references cited.